US007241221B1

(12) United States Patent
Luciano, Jr. et al.

(10) Patent No.: US 7,241,221 B1
(45) Date of Patent: Jul. 10, 2007

(54) GAME FOR USING REMAINDER AND PARTIAL CREDITS

(76) Inventors: Robert A. Luciano, Jr., 300 Sierra Manor Dr., Reno, NV (US) 89511; Loren T. Nelson, 300 Sierra Manor Dr., Reno, NV (US) 89511

( * ) Notice: Subject to any disclaimer, the term of this patent is extended or adjusted under 35 U.S.C. 154(b) by 271 days.

(21) Appl. No.: 10/732,895

(22) Filed: Dec. 10, 2003

Related U.S. Application Data

(60) Provisional application No. 60/432,476, filed on Dec. 10, 2002.

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/20; 463/25

(58) Field of Classification Search .................. 463/25, 463/20

See application file for complete search history.

(56) References Cited

U.S. PATENT DOCUMENTS 5,277,424 A * 1/1994 Wilms ......................... 463/12
5,429,361 A * 7/1995 Raven et al. ................. 463/25
5,813,511 A * 9/1998 Takemoto et al. .......... 194/217
6,089,982 A * 7/2000 Holch et al. .................. 463/42
6,685,559 B2 * 2/2004 Luciano et al. ............... 463/16
2001/0041610 A1 * 11/2001 Luciano et al. ............... 463/16

OTHER PUBLICATIONS

U.S. Appl. No. 10/750,275, filed Dec. 30, 2003, specification including description, claims, abstract, drawings.
U.S. Appl. No. 09/967,197, filed Sep. 28, 2001, specification including description, claims, abstract, drawings.
U.S. Appl. No. 09/788,168, filed Feb. 15, 2001, specification including description, claims, abstract, drawings.
U.S. Appl. No. 09/742,679, filed Dec. 20, 2000, specification including description, claims, abstract, drawings.

* cited by examiner

*Primary Examiner*—Corbett B. Coburn
*Assistant Examiner*—Jasson H. Yoo

(57) ABSTRACT

A game usable by a player to make use of either residual game credits or partial game credits is disclosed. New aspects of the game include a fixed wager amount that is convertible with valid voucher from other games in a casino, a fixed win amount per game win event per session (a game session is a plurality of individual game plays), and the game's ability to repeat game play without player intervention. These qualities allow a player to present otherwise unusable or uninteresting game credits to the game of the present invention and then watch as the game first determines the number of individual game plays and then plays an entire game session without any player interaction required.

9 Claims, 1 Drawing Sheet

Residual Credit
Game Play

GAME FOR USING REMAINDER AND PARTIAL CREDITS

RELATED APPLICATION

This application claims priority to provisional application 60/432,476 filed on Dec. 10, 2002.

BACKGROUND OF THE INVENTION

1. Field of the Invention

This invention pertains generally to gaming (wagering) devices. More particularly, the invention is for a new kind of game that allows players to make use of remainder or partial credits in a fast, exciting manner.

2. The Prior Art

As more traditional casinos (Class III gaming establishments) and Amerindian Class II gaming establishments make use of vouchers, tickets, and other cashless technologies (as well as game tokens only usable in the establishment), players are often left with either vouchers or tokens having a small or unplayable number of credits on them. This can occur because the player needs to end their stay at the establishment or a player does not have enough credits to place a minimum bet. The later can occur, for example, in an establishment having nickel, dime, quarter and dollar minimum gaming machines. A player may start play on a nickel machine, cash out with a voucher having a value of $22.65, and then play on a dollar machine. Upon use of the $22.00, the player can no longer play the game (can't use the remaining $0.65). In this case, players typically do not want to go to a cashier's station and get 65 cents—they would rather just use it.

Until now, there was no way a player could make use of these small amount vouchers in an expeditious and exciting manner.

BRIEF DESCRIPTION OF THE INVENTION

The present invention provides a new method and apparatus that enables players of gaming machines (gambling machines, whose outcome is based at least partially on random events) to use up both partial credits (too few credits to make a wager on the machine they are or were playing) and residual credits (too few credits to bother cashing in before leaving the casino).

The present invention will, in one embodiment, make use of existing gaming cabinets having video screens, or programmable buttons and selectable paytables, and their associated hardware and software (with the game-specific software installed in addition to the standard hardware and software needed to support game functions). In another embodiment there will be a special game cabinet built for this game, with associated signage. The game cabinet will use the hardware and software typical in a gaming machine, with the addition of additional software to implement the game of the present invention. In both cases the game-specific software will allow a player to make use of their partial or residual credits in a new and exciting manner.

The new game incorporates a paytable (or uses centralized pools of game results) that, when a winning event occurs, always pays the same amount for any given game session (a game session comprises a plurality of game plays). The game uses a wagering amount that is equal to or less than the credits used to play regular gaming machines. In one embodiment, the wager amount is set so that no matter what game the player uses in a casino, that amount can always be translated into the wager amount of this game. For example, if US currency is being used in the casino then the game may be set up to use wager amount of $0.01, which evenly divides any residual or partial game credits a player may have from other games.

The wager amount is used to determine the number of game plays a player will get when they provide their partial or residual game credits to this game. In a preferred embodiment, the number of game plays is equal to the wager amount (in the example of the last paragraph, that means the number of game plays is equal to the value of any credits in $0.01; a voucher for $2.37 equals 237 game plays). Once the number of game plays is determined, the game is ready to be played.

Game play is substantially different for this game than the prior art. The game play may start with the player hitting a start button, or, upon credits being entered, may trigger game play automatically. The game goes through and plays all individual game plays without any intervention from the player. For example, if a player has a partial credit of $0.67 and the game has a wager amount of $0.01, there will be 67 individual game plays all of which a played with no player intervention. A winning event always yields the same win amount (makes for faster play), in this example $100.00. The game (slots, bingo, or central determination style) plays all 67 individual game plays in rapid succession, tallying up any winning events in a manner visible to a player. The game is specifically set up to allow very fast individual game plays, allowing the player to get a "last chance" to use up otherwise uninteresting or non-useful credits in a fast, exciting, and possibly rewarding manner. Key components needed in order to do this is to design the game to run consecutive game plays without any player interaction, and with only a single win amount upon each winning event.

The wager amount and pay-out percentage may be selectable by the casino. Further explanation is provided below and in Provisional Application 60/432,476 filed on Dec. 10, 2002, which is incorporated herein, in full, be explicit reference. The present invention enables a casino to set the wager amount based on any selected set of machines having pay-out tickets or game credit vouchers that are usable with the game of the present invention. The wager is set to be a number equal to or lower than the lowest wager of the other machines, and to be able to equally divide those other amounts (the wager amount must yield a whole number of game plays). The casino can group banks of machines, buildings, floors, or other arrangements to make use of the game of the present invention.

BRIEF DESCRIPTION OF THE DRAWING

The present invention will be more fully understood by reference to the following drawing, which is for illustrative purposes.

DETAILED DESCRIPTION OF THE INVENTION

Figure 1:
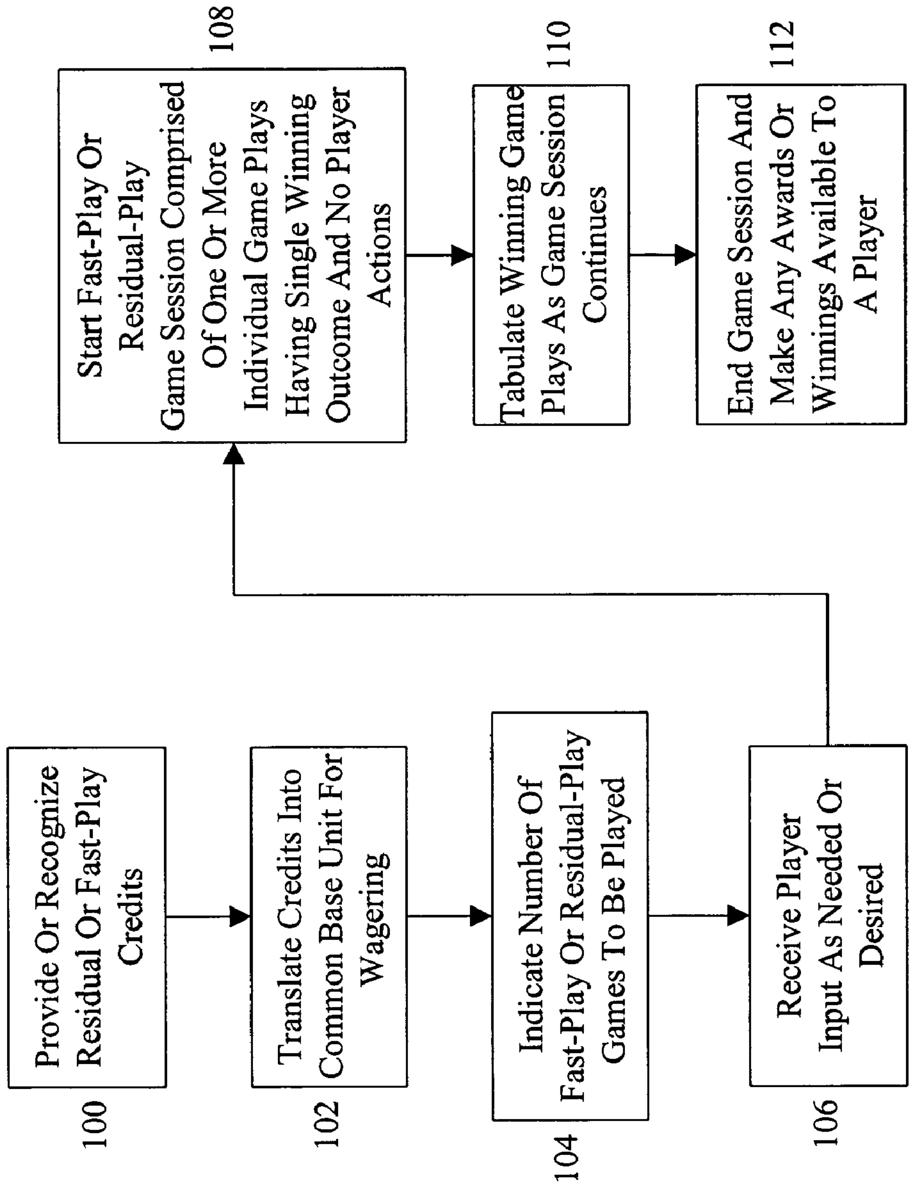
FIG. 1 shows a method if using the present invention.

Persons of ordinary skill in the art will realize that the following description of the present invention is illustrative rather than limiting. Other embodiments of the invention will readily suggest themselves to such skilled persons having the benefit of the present disclosure.

Referring to the drawing, for illustrative purposes the present invention is illustrated in FIG. 1. It will be appreciated that the method may vary as to details, optional acts, partitioning, and the order of the acts, without departing from the inventive concepts disclosed herein.

The present invention enables player to make use of "remainders", where a remainder is a voucher, cash-out ticket, an amount of credits (including partial credits, such as 0.43 credits on a dollar game machine) or any other form of game credits in a fun, exciting, and yet very expeditious manner.

The present invention is usable with any possible credit configuration (including monies from different countries, credits with a value under USD $0.01, etc.). A preferred embodiment, and the embodiment most extensively described in this application, uses a base unit of USD $0.01. It is to be clearly understood, however, that other embodiments of the present invention may make use of any other base unit or measure to which other units or measures may be converted, for example $0.001 (and having a winnable prize of a dollar amount such as $10.00) which enables the use of credit values under $0.01; use with multiple currencies and house tokens; use with multiple credit levels (prize levels) within a casino; and any other form of game credits. All fully within the inventive nature of the present disclosure.

In one preferred embodiment, the base amount recognized by the game machine will be $0.01. The game of the present invention will be set to a single winning amount based on the base amount, with one preferred embodiment being $100.00. The game will be played (a single game event) in units of a cent, and any winning event will yield the same win amount, in this example one hundred dollars. The game will first receive the credits, partial credits, cash-out slips, vouchers, smart cards, or any other means or method of transferring credits, and translate any and all values into increments of the base unit (there will be a known algorithm to translate any of the above described input into an equivalent number of base units, in this example the base unit being $0.01). The game then sets up a single game play session, which initially (in order to start the session, which is comprised of many individual game plays) may or may not require player participation, as will be explained more fully below. In a preferred embodiment, the game then goes through the base game play sequence without requiring player intervention for as many times as there are base units.

An example would be a player inserting a voucher having 2.37 credits from a dollar machine, in which case there will be 237 base units. The game will then, once ready to play and after the player hits the "start" button, repeat the game play 237 times. This is defined as a game session. It is important to note that each individual game play that makes up a game session may yield a $100.00 win for the player. The game plays the entire number of base units without further player interaction.

Continuing with the present example, that means the game would play 237 individual games ($0.01 games), each game having an equal probability of winning the player $100.00. As wins occur, they will be tallied in a counter visible to a player. At the end of the play sequence (however many individual games that was), the player will be awarded the amount of cash shown in the winnings counter (in another embodiment, they may be issued a cash-out ticket, an equivalent number of credits, a voucher, or other payment means as desired by the Class III or Class II establishment).

The game of the present invention may be played and shown to a player in any manner of ways and using many game of chance paradigms (Nevada-style slot machine displays, Class II scratch ticket or bingo card games, etc.).

To make use of a traditional Nevada-style games such as slots, the game's paytable is specially constructed for this game, having only $100.00 payouts (this is an exemplar—any single win amount may be used) when any winning symbol combination occurred, and the game is constructed and designed to repeat play (spins, for slot machines) without player intervention, once started, until all credits, partial credits, etc., are used. If it were desirable to have an 80% payback paytable for use with a slot-style machine, and using the $0.01 base unit and a $100.00 win amount, the paytable would be structured to have an overall probability of a winning event of any kind (since any paying symbol combination has the same payout) of 1/12,500.

To make use of the present invention in a Class II environment, the preferred embodiment is a bingo interface; a scratcher-ticket style interfaces could also be used. To use a bingo interface, a preferred embodiment of the game of the present invention makes use of prize pools and a participation rate (alternatively called a participation percentage).

The participation percentage is the percentage of participating bingo card entries that will receive non-zero prizes. There will be a pre-drawn pool (i.e., an existing pool having a set of elements that are drawn such that there is a predetermined and specified percentage hold and payout) having a finite number of entries (elements, members) when it is created, each entry having a value of $100.00. The player is given a $0.01 card to play per $0.01 value of remaining or left over or unused credits, and based on a participation percentage of ½ (1 out of 2 bingo cards will be a winner), the bingo game will be played with a 150% payout (when the 1 out of 2 win rate, or ½ participation percentage, is taken into account, the casino or bingo hall will net a 25% hold).

The player initiates bingo game play, and if auto-daub is chosen (in one preferred embodiment it will be the player's choice), then the bingo game system will play, in succession and without further player intervention, a set of bingo games equal to the number of $0.01 cards the player purchased with their remainder or partial credits. Each bingo win will award the player $100.00, and as the number of $0.01 tickets is played out, the total winnings will be shown to the player in a counter.

As stated above, prize pools are comprised of finite number of prizes (all pool elements correspond to prizes; there are no zero-value elements). Used in combination with a known percentage of winners (the participation percentage), the total percentage of revenue that is given out as prizes can be consistently controlled, providing for a non-banked bingo game. This is especially straightforward when all prize amounts are the same value (in the example above, $100.00) with a fixed participation rate or percentage. Alternatively, a pool can be created where the pool elements have both zero and non-zero elements, and working with a ½ participation rate (i.e., where a pool element will be drawn for every 1 out of 2 players), the overall payout rate can be kept at a predetermined level (on a per-pool basis).

The game of the present invention may further be utilized in any central determination ("CD") jurisdiction, such as Amerindian casinos in Washington State. CD requires that upon the start of each game play, a game request goes to a central server having a database thereon, a game result is chosen by drawing a game result from an active pool (an electronic version of a pool of scratch tickets, or similarly to any centralized lottery system). The game receives the chosen prize pool element and its value. The value may be zero (will be zero in the majority of cases). The game then maps the result into a visual display corresponding to a game of chance, most often a slot machine. The process of mapping a known result into a visual display corresponding to a game of chance is called reverse-mapping. The results sent to the game machine from the central server are reverse mapped into a visual display corresponding to a game of chance (may include games where chance plays some role but is also partially dependent on a player's skill, such as poker).

Thus, in a CD jurisdiction the game of the present invention would be used by determining a base unit amount (in a preferred embodiment $0.01), having a player insert partial or full credit values into the machine, making the number of $0.01 games visible to the player, having the player set up the game to be played (if required; may not be for some games), and then game machine will run a sequence of game plays equal to the number of cents the player provided as credit (a game session), all without any further intervention by the player. Each win, if and when any occurs, will be a $100.00 win. The amounts won will be kept on a counter visible to a player. The game session ends when the required number of individual game plays is carried out. Each game play will be carried out in the manner required by a CD game, providing an element from a common pool. Note that if the number of individual game plays is high, that number of game play results can be sent in toto to the game machines, which will then present the results to the player in the most expeditious manner possible while still showing each individual game play. Alternatively, if allowed by local laws, the results of all the individual games played (the entire game session) may be displayed at once as a net won result.

The game of the present invention may be physically implemented in many ways. One preferred embodiment will have a specially designated button visible to a player on a gaming machine (the gaming machine being one that is typically found in Nevada, Amerindian casinos, etc., modified by the addition of the new or special button, where the button may be a re-coded existing button, an additional added button, a touch screen button, an additional touch screen panel with indicators thereon, etc.). The game machine will play normally until the player hits the new "Last Game", "Partial Credits Game", or otherwise indicated button for this new game play. Remaining credits and/or partial credits are displayed in a counter box, and the game being displayed on the gaming machines video screen is switched to the game of the present invention. The player then makes any required choices (this will depend on if it is a Nevada-style, CD, or bingo style presentation and further on which game in those styles of games are being used). The player then hits the "start" button and the game machine plays the game of the present invention until finished (a game session comprised of one or more individual game plays).

A second preferred embodiment will have a dedicated stand-alone game machine that only plays the game of the present invention. The basic gaming machine will use the known hardware for gaming machines, with software installed that implements this specific game. Players bring vouchers with full or partial credits thereon, tokens, cash-out tickets, cash (if desired), and any other form of credit information and inserts it (or them) into the game machine. The game machine plays the implemented game of the present invention by determining a number of $0.01 games to play (or other base unit of exchange), allowing any needed player input, and then going through the number of games according to the number of $0.01 games the player has without further player interaction. A counter lets the player keep track of how many $100.00 winners they have as each game play is carried out.

FIG. 1 shows a method of using the present invention. Starting at box 100, in one embodiment a player provides the game with partial credits. In other embodiments, the player provides the game with any type of credits or cash, including but not limited to partial credits. Further, if the casino has electronic funds transfers, a player may make use of a player account to transfer funds to the gaming machine having the game of the present invention installed therein. Continuing into box 102, and as has been discussed, after the player has provided some form of credits or other input, the game of the present invention will accept the input and convert it into some number of base game play units. In this example, the base game play wagering unit is $0.01.

Continuing into box 104, the player is shown the number of individual game plays they have entered, which will also be the number of individual game plays played in the coming game session. In one preferred embodiment, the player will be able to make a final selection of the number of individual game plays for this game session, where the number is less than or equal to the number of game plays allowed by the credits they have entered.

Continuing into box 106, any needed player input is gathered by the machine for the game from the player. The actions corresponding to this box are expected to be used most often in bingo-style games (for example, choosing auto-daub or not) or in CD games (for example, a player may input a number sequence to enable the game to reverse map results obtained from a central server into winning and loosing number sequences to be displayed to the player). Slots require no input other than the touching of the "start" button.

Continuing into box 108, a player initiates game play by hitting a start button or any equivalent. The actions corresponding to box 108 include repeated individual game plays, the number of game plays for this game session being already determined above. This can be called several things, including "fast-play" (indicating that the individual game plays making up a game session are repeated very quickly) or "residual-play" (to indicate that a player may make use of the left-over credits on this game). Two important differences between this game and existing games are: there is a single win amount for any win event, based on the base unit of exchange and the pay-out percentage, and the player does not interact with the game once the game session has started.

Continuing to box 110, as a game session is played out on the game and whenever an individual game play results in a win, the win is tabulated and shown to a player in some manner. Clearly box 110 is optional, but will be used in a preferred embodiment to add player interest and excitement.

After the game session ends, the actions corresponding to box 112 are carried out. This means that any winnings are given to the player in a manner consistent with the casino's needs and the player input (may be cash, a voucher, credits or rewards on a player tracking card, electronic funds transfer, etc.).

What is claimed is:

1. A method for using partial game credits in a gaming environment, the method comprising:

providing at least one gaming machine presenting a game;

accepting game credits from the player;

initiating a gaming session wherein full credits are used for game play;

determining a number of game plays available for the partial credits when an insufficient amount of full credits are available for game play;

receiving player input initiating game play using partial credits;

automatically playing the determined number of game plays using partial credits as wagers, wherein a single, fixed award value is assigned to all winning events when automatically playing the determined number of game plays; and making an aggregate award value available to the player, wherein the aggregate award value is the product of the number of winning events and the single, fixed value of the winning events.

2. The method of claim 1, wherein determining the number of game plays available for the partial credits further comprises dividing the value of the partial credits by a wager value, wherein the wager value yields a whole number of game plays greater than one game play.

3. The method of claim 2, wherein the wager value is $0.01.

4. The method of claim 2, wherein the single, fixed value is based upon the wager value and a payout percentage of the gaming machine.

5. A method for using partial game credits in a gaming environment, the method comprising:

providing a game on a gaming machine, wherein the gaming machine accepts full credit and partial credit wagers, and wherein a fixed award value is assigned to all winning events based upon game play using partial credit wagers;

accepting game credits from a player;

displaying the number of full credits and partial credits available to the player;

initiating a gaming session, wherein full credit wagers are used to play the game;

continuing the gaming session using partial credit wagers when there is not enough game credits available for full credit wagers, wherein game play with partial credit wagers occurs without player input;

counting and displaying the number of winning outcomes events based upon partial credit wagers; and presenting an aggregate award value to the player, wherein the aggregate award value is the product of the number of winning outcomes based upon partial credit wagers and the fixed award value.

6. A method for using residual game play credits in a gaming environment, the method comprising:

providing at least one gaming machine presenting a game, wherein every winning game outcome of the game has the same prize value;

accepting residual game credits from a player;

determining a number of game plays available to the player by dividing the residual game credits by a wager value;

generating game outcomes for the determined number of game plays, wherein the game plays occur without player input; and awarding an aggregate prize value, wherein the aggregate prize value is the product of the number of winning outcomes and the prize value.

7. The method of claim 6, further comprising receiving player input selecting the wager value.

8. The method of claim 6, wherein the credit value is $0.01.

9. The method of claim 6, wherein the prize value is based upon the credit value and a payout percentage of the gaming machine.

* * * * *